United States Patent [19]

Nishiyama

[11] Patent Number: 4,571,067

[45] Date of Patent: Feb. 18, 1986

[54] DETECTING DEVICE FOR OPTICAL SCANNING SYSTEM POSITION SUITABLE FOR ELECTROPHOTOGRAPHIC COPYING MACHINE

[75] Inventor: Haruo Nishiyama, Nara, Japan

[73] Assignee: Sharp Kabushiki Kaisha, Osaka, Japan

[21] Appl. No.: 542,207

[22] Filed: Oct. 14, 1983

[30] Foreign Application Priority Data

Oct. 22, 1982 [JP] Japan .................................. 57-186358

[51] Int. Cl.⁴ ............................................ G03G 21/00
[52] U.S. Cl. .................................. 355/14 SH; 355/8; 355/3 SH
[58] Field of Search ............. 355/14 SH, 14 R, 3 SH, 355/3 R, 8

[56] References Cited

U.S. PATENT DOCUMENTS

| | | | |
|---|---|---|---|
| 4,009,957 | 3/1977 | Suzuki et al. | 355/8 X |
| 4,026,647 | 5/1977 | Kanno et al. | 355/14 SH |
| 4,413,900 | 11/1983 | Abe et al. | 355/8 |

*Primary Examiner*—R. L. Moses
*Attorney, Agent, or Firm*—Birch, Stewart, Kolasch & Birch

[57] ABSTRACT

An electrophotographic copying machine comprises a device for detecting the position of a moving optical scanning system. The moving optical scanning system may be a copy object plate or a part of lenses and mirrors forming the optical scanning system. The device comprises a potentiometer positioned along the path of the copy object plate or the part of the lenses and the mirrors. The potentiometer is responsive to the position of the copy object plate or the part of the lenses and the mirrors for providing position signals by which a copy paper is pulled into the electrophotographic copying machine to transfer an electrostatic latent image thereon.

7 Claims, 3 Drawing Figures

DETECTING DEVICE FOR OPTICAL SCANNING SYSTEM POSITION SUITABLE FOR ELECTROPHOTOGRAPHIC COPYING MACHINE

BACKGROUND OF THE INVENTION

The present invention relates to an electrophotographic copying machine and, more particularly, to a device for detecting the position of an optical scanning system for an electrophotographic copying machine.

Conventionally, an electrophotographic copying machine produces an electrostatic latent image on an optical-sensitive member. The latent image corresponds to an image on a copy object such as a manuscript or book. Toner particles are adhered to the latent image, so that the latent image becomes visible to form a copied image.

To form the latent image on the optical-sensitive member, while the optical-sensitive member is charged uniformly, a reflected image from the copied object is projected upon the optical-sensitive member, so that the charges at the light projected portions are released to produce voltage differences between the light projected portions and the light non-projected portions. The electrostatic latent image is thus produced.

As the optical-sensitive member is rotated to which the optical image from the object should be projected, the object must be subjected to optical scanning. To cause the optical scanning on the object disposed on an object plate, the object plate is moved in synchronization with the rotation of the optical-sensitive member while the optical scanning system including lenses and mirrors is fixedly positioned. In the alternative, at least a part of the optical scanning system is moved along the object plate while the object plate is fixed.

Thus, the object plate or the part of the optical scanning system must be moved in synchronization with the rotation of the optical-sensitive member.

Conventionally, a plurality of microswitches and sensors is positioned along the path of the object plate or the part of the optical scanning system to detect the position of the optical scanning system and the part. The positions of the microswitches and the sensors are adjusted because they must be positioned at the initial position and the return position of the object plate or the part of the optical scanning system. Such adjustment steps are rather complicated, so that it is desired to present a simple position detecting system.

SUMMARY OF THE INVENTION

Accordingly, it is an object of the present invention to provide an improved device for detecting the position of an optical scanning system for an electrophotographic copying machine.

It is another object of the present invention to provide an improved electrophotographic copying machine comprising a device for detecting the position of an optical scanning system.

Briefly described, in accordance with the present invention, an electrophotographic copying machine comprises a device for detecting the position of an optical scanning system. The optical scanning system includes a moving part such as a copying object plate or a part of lenses and mirrors forming the optical scanning system. The device comprises a potentiometer positioned along the path of either the copy object plate or the part of the lenses and the mirrors. The potentiometer is responsive to the position of the moving part, either the copy object plate or the part of the lenses and the mirrors, to in order to provide position signals by which a copy paper is pulled into the electrophotographic copying machine to transfer an electrostatic latent image thereon.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
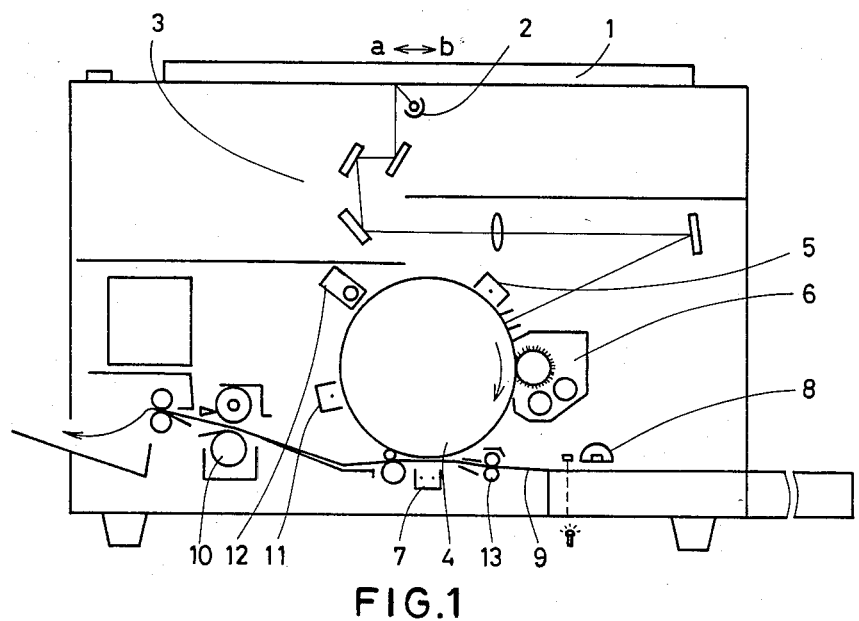
FIG. 1 shows a sectional view of an electrophotographic copying machine according to the present invention.

FIG. 1 shows a sectional view of an electrophotographic copying machine of the present invention. In a preferred form of the present invention, a type of electrophotographic copying machine for reciprocating a copy object plate for carrying a manuscript or book is shown. However, it should be noted that the present invention can be applied to another type of electrophotographic copying machine wherein a part of an optical scanning system including lenses and mirrors is the part being moved along the copy object plate.

The electrophotographic copying machine of FIG. 1 comprises a copy object plate 1, a light source 2, an optical system 3, an optical-sensitive member 4, a pre-charger 5, a developing section 6, a transference charger 7, a paper pick-up roller 8 and a pair of paper supply rollers 13 for a paper 9, an image fixing device 10, a charge-removal charger 11, and a cleaner 12.

The copy object plate 1 is positioned at the top of the copying machine. The plate 1 can be reciprocated in the directions a and b. On the copy object plate 1, a copy object such as a manuscrtipt or book is disposed to which light is projected by the light source 2. The optical system 3 is used to focus a reflected image from the object on the optical-sensitive member 4. The optical system 3 comprises lenses and mirrors for this purpose.

In a preferred form of the present invention as described below, the optical scanning system 3 is fixed while the object plate 1 is moved. In another preferred form part of the lenses and the mirrors forming the optical scanning system 3 is moved while the object plate 1 is fixed, and a potentiometer for detecting the position of the part is connected to the part, if necessary, via a suitable member.

The optical-sensitive member 4 is formed around a drum. The pre-charger 5 is provided for uniformly pre-charging the optical-sensitive member 4 before the member 4 receives the reflected image.

Responsive to the reflected light image from the object, an electrostatic latent image is formed on the optical-sensitive member 4. The developing section 6 is provided for changing the latent image into visible toner image. The transference charger 7 is provided for electrostatically transferring the toner image upon the paper 9 which is picked up by the paper pick-up roller 8. The image fixing device 10 is provided for fixing the toner image on the paper 9, so that the image on the copy object is copied on the paper 9.

After the toner image is transferred on the paper 9, the remaining charges on the optical-sensitive member 4 are removed by the charge-removal charger 11. The cleaner 12 is provided for cleaning the toner particles remaining on the optical-sensitive member 4.

Responsive to a paper pick-up signal generated in response to the generation of a copy start signal, the paper pick-up roller 8 is rotated at a full turn, so that a single sheet of the paper 9 is picked up. The picked-up paper 8 stops at the position of the pair of paper supply rollers 13. This is because the leading edge of the latent image on the optical-sensitive member 4 must correspond to the leading edge of the picked-up paper 9. Responsive to a position detection signal developed when the object plate 1 is moving in the light exposure direction b, the pair of paper supply rollers 13 are rotated to start the supply of the paper 9.

Figure 2:
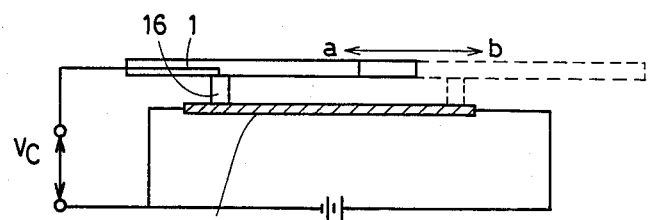
FIG. 2 shows a sectional view of a position detecting device according to the present invention.

FIG. 2 shows a sectional view of the divice for detecting the position of the object plate 1 according to the present invention.

As FIG. 2 shows, a potentiometer 14 is provided under the position of the object plate 1. A conductive brush 16 is carried by the object plate 1 and positioned between the object plate 1 and the potentiometer 14. A power source 15 is connected to the potentiometer 14 to power it.

The potentiometer 14 is disposed parallel to the path of the object plate 1 to detect the position of the object plate 1. Of course, the potentiometer 14 is positioned outside the light image forming section.

Under the object plate 1, an insulating member is disposed through which the conductive brush 16 is electrically connected between the object plate 1 and the potentiometer 14.

As the object plate 1 moves, the conductive brush 16 is moved along the potentiometer 14, so that the voltage difference between the conductive brush 16 and the potentiometer 14 varies in conformance with the position of the object plate 1. By detecting the voltage change, the position of the object plate 1 can be detected.

With reference to FIG. 2, an object plate starting position can be detected by detecting the voltage at the time when the object plate 1 is positioned at the state as shown in the real line. A return of final position of the object plate 1 as shown in the dotted line can be detected by detecting a voltage at this stage. When the object plate 1 is moving toward its final position the brush 16 provides increasingly greater voltages in proportion to its position. During the return of the object plate 1, the brush 16 provides decreasing voltages in proportion to the return distance of the object plate 1.

Thus, the distance covered of the object plate 1 is converted into the voltage by the potentiometer 14. The converted voltage is detected via the conductive brush 16.

Figure 3:
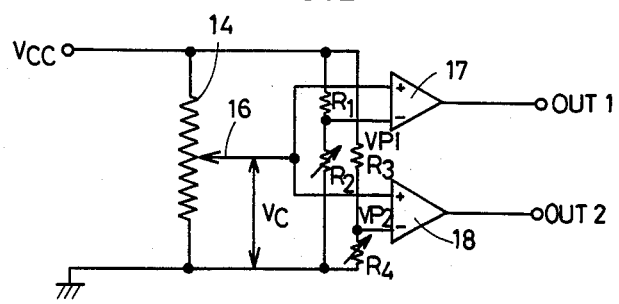
FIG. 3 shows a block diagram of a circuit for detecting the position of a copy object or a part of an optically scanning system and for providing position signals by which a copy paper is pulled into the electrophotographic copying machine to transfer an electrostatic latent image thereon.

FIG. 3 shows a block diagram of a circuit for detecting the position of the object plate 1 according to the present invention.

Like elements corresponding to those of FIG. 2 are indicated by like numerals.

A voltage VCC from the power source 15 is applied to the potentiometer 14. The conductive brush 16 connected to the potentiometer 14 is coupled to the plus input terminals of comparators 17 and 18. In parallel with the potentiometer 14, two series circuits are connected. A first series circuit comprises a first resistor R1 and a second variable resistor R2. A second series circuit comprises a third resistor R3 and a fourth variable resistor R4.

The connection between the first resistor R1 and the second variable resistor R2 is connected to the minus input terminal of the first comparator 17. The connection between the third resistor R3 and the fourth variable resistor R4 is connected to the minus input terminal of the second comparator 18.

The first comparator 17 is provided for detecting the starting position of the object plate 1. The second comparator 18 is provided for detecting the position of the object plate 1 for starting the paper.

To detect the return position of the object plate 1, an additional comparator may be needed.

To the minus input terminals of the comparators 17 and 18, each of reference voltages VP1 and VP2 respectively divided with the first resistor R1 and the second variable resistor R2, and the third resistor R3 and the fourth resistor R4 is applied. To the plus input terminals of the comparators 17 and 18, the voltage VC detected with the conductive brush 16 is applied. The change of the voltage VC corresponds to the distance traveled by the object plate 1.

When the object plate 1 moves in the anti-light exposure direction a toward the initial position, the voltage detected with the conductive brush 16 is reduced, so that the voltage VC to be applied to the plus input terminal of the first comparator 17 becomes less than the voltage VP1 at the minus input terminal. Here, the first comparator 17 changes an output signal from a high level to a low level. A control circuit is responsive to this fall signal for detecting that the object plate 1 is positioned at the initial position. The plate 1 is permitted to stop at the initial position as shown in the real line of FIG. 2.

Responsive to the copy start signal, the control circuit provides reciprocating signals for enabling the object plate 1 to continue to move and enabling the drum to be continuously rotated in synchronization with the traveling of the object plate 1, so that the optical image can be focused on the optical-sensitive member 4.

As the object plate 1 moves from the initial position to the light exposure way in the direction b, the conductive brush 16 presents more and more voltages. The paper pick-up roller 8 is rotated fully to pick up the paper 9.

When the paper supply starting position of the object plate 1 is reached it should be assured that, at the position of the image transference charger 7, the leading edge of the optical image on the optical-sensitive member 4 corresponds to the leading edge of the paper 9. At this timing the voltage VC of the conductive brush 16 becomes more than the voltage VP2 applied to the minus input terminal of the second comparator 18. The second comparator 18 changes an output signal from the low level to the high level. Responsive to the rising signal from the second comparator 18, the control circuit starts the rotation of the pair of paper supply rollers 13. The paper 9 is transported from the rollers 13 to the position of the charger 7.

When the object plate 1 reaches the return position, the additional comparator may change an output signal from the low level to the high level, so that the control circuit can detect the object plate return position by which the object plate 1 is moved to the initial position. At the initial position, the object plate 1 stops according to the detection of the initial position.

The detecting position of the object plate 1 can be changed and calibrated by changing the reference voltages VP1 and VP2 to be applied to the minus input terminals of the two comparators 17 and 18. This change can be controlled by selecting the resistances of the variable resistors R2 and R4.

For example, when the paper supply timing by the paper supply roller 13 is premature, the second reference voltage VP2 should be greater by making the resistance of the fourth variabel resistor R4 greater.

While only certain embodiments of the present invention have been described, it will be apparent to those skilled in the art that various changes and modifications may be made therein without departing from the spirit and scope the present invention as claimed.

What is claimed is:

1. A position detecting device for detecting the position of an optical scanning means for an electrophotographic copying machine comprising:

said optical scanning means enabling light to be scanned towards a copy object disposed on a plate means, said optical scanning means including means to reciprocate said optical scanning means;

potentiometer means responsive to a position of the optical scanning means for providing a voltage in conformance with said position of said optical scanning means; and detection means responsive to said voltage from said potentiometer means for providing a signal for controlling a supply of paper into said electrophotographic copying machine.

2. The device of claim 1, wherein the detection means comprises comparator means.

3. The device of claim 2, wherein said comparator means includes:

first comparator means for detecting the starting position of the optical scanning means; and second comparator means for detecting the paper starting position at which timing the paper is moved toward an image transference section of said copying machine.

4. The device of claim 3, wherein said first comparator means receives at a plus input terminal a voltage detected by the potentiometer means and at a minus input terminal a first divided voltage from a power source voltage, and the second comparator means receives at a plus input terminal said voltage detected by the potentiometer means and at a minus input terminal a second divided voltage from the power source voltage.

5. The device of claim 4, wherein said first divided voltage is provided by a first resistor and a first variable resistor, and said second divided voltage is provided by a second resistor and a second variable resistor.

6. The device of claim 1, wherein said optical scanning means is a copy object plate on which said copy object is disposed.

7. The device of claim 1, wherein said optical scanning means comprises mirrors and lenses for passing light toward said copy object.

* * * * *